(12) United States Patent
Kudoh

(10) Patent No.: US 6,263,544 B1
(45) Date of Patent: Jul. 24, 2001

(54) KNOB FOR A STICK SWITCH INCLUDED IN A MOBILE TERMINAL

(75) Inventor: Kazuhiro Kudoh, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/342,100

(22) Filed: Jun. 29, 1999

(30) Foreign Application Priority Data

Jun. 30, 1998 (JP) .................................................. 10-183792

(51) Int. Cl.⁷ ................................ G05G 9/47; G05G 1/10
(52) U.S. Cl. ............................................. 16/441; 16/110.1
(58) Field of Search .................................. 16/441, 110.1; 74/483 PB; 200/516, 520, 329, 341, 343, 34 J; 400/490, 491.3, 493, 494

(56) References Cited

U.S. PATENT DOCUMENTS

| | | | |
|---|---|---|---|
| 2,259,077 | * 10/1941 | Morgan | 16/441 X |
| 4,719,455 | 1/1988 | Louis | 340/709 |
| 5,278,557 | 1/1994 | Stokes et al. | 341/34 |
| 5,528,235 | * 6/1996 | Lin et al. | 200/343 X |
| 5,536,911 | 7/1996 | Madill | 200/6 |
| 5,631,453 | * 5/1997 | Maeda | 200/6 A |
| 5,790,108 | * 8/1998 | Salcudean et al. | 345/184 |

FOREIGN PATENT DOCUMENTS

| | | |
|---|---|---|
| 61-101920 | 6/1986 | (JP) . |
| 63-19722 | 2/1988 | (JP) . |
| 2-109226 | 4/1990 | (JP) . |
| 6-54155 | 7/1994 | (JP) . |
| 6-260056 | 9/1994 | (JP) . |
| 8-111144 | 4/1996 | (JP) . |
| 8-161979 | 6/1996 | (JP) . |
| 9-204234 | 8/1997 | (JP) . |
| WO 90/15427 | 12/1990 | (WO) . |

* cited by examiner

Primary Examiner—Robert J. Sandy
(74) Attorney, Agent, or Firm—Sughrue, Mion, Zinn, Macpeak & Seas, PLLC (57) ABSTRACT

A knob mounted on one end of a stick included in a stick switch and selectively sinkable in the axial direction of the stick or tiltable in any one of preselected directions. The knob further includes a concave surface formed on an end opposite to an end to be mounted to the stick. At least one projection protrudes from the concave surface. The knob is easy to operate and promotes the small size, miniature configuration of a mobile terminal.

8 Claims, 7 Drawing Sheets

KNOB FOR A STICK SWITCH INCLUDED IN A MOBILE TERMINAL

BACKGROUND OF THE INVENTION

The present invention relates to a stick switch included in a handy phone or similar mobile terminal and more particularly to a knob for the stick switch.

Many of mobile terminals including handy phones extensively used today each are provided with a stick switch having a knob to be operated by the user. A conventional knob mounted on a stick switch has its end exposed to the outside via a hole formed in the casing of a mobile terminal, so that the user of the mobile terminal can touch the end of the knob for moving the knob. However the conventional knob has some problems left unsolved, as follows. First, the prerequisite with the knob is that it does not protrude from the surface of the mobile terminal. The user's finger cannot easily catch such a knob and is apt to slip on the knob. This makes it difficult for the user to move the stick switch delicately.

Further, if the height of the knob is determined with importance attached to easy operation, the mobile terminal must be made thick enough to prevent the end of the knob from protruding from the casing of the mobile terminal. This obstructs the miniaturization of the mobile terminal.

Technologies relating to the present invention are disclosed in Japanese Utility Model Laid-Open Publication Nos. 61-101920, 63-19722 and 6-54155 and Japanese Patent Laid-Open Publication Nos. 9-204234, 8-111144, 6-260056, 2-109226 and 8-161979.

SUMMARY OF THE INVENTION

It is therefore an object of the present invention to provide a knob or a stick switch that is easy to operate and promotes the miniature, thin configuration of a mobile terminal.

A knob of the present invent ion is mounted on one end of a stick included in a stick switch and selectively sinkable in the axial direction of the stick or tiltable in any one of preselected directions. A concave surface is formed on one end of the knob opposite to the other end to be mounted to the stick. At least one projection protrudes from the concave surface.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
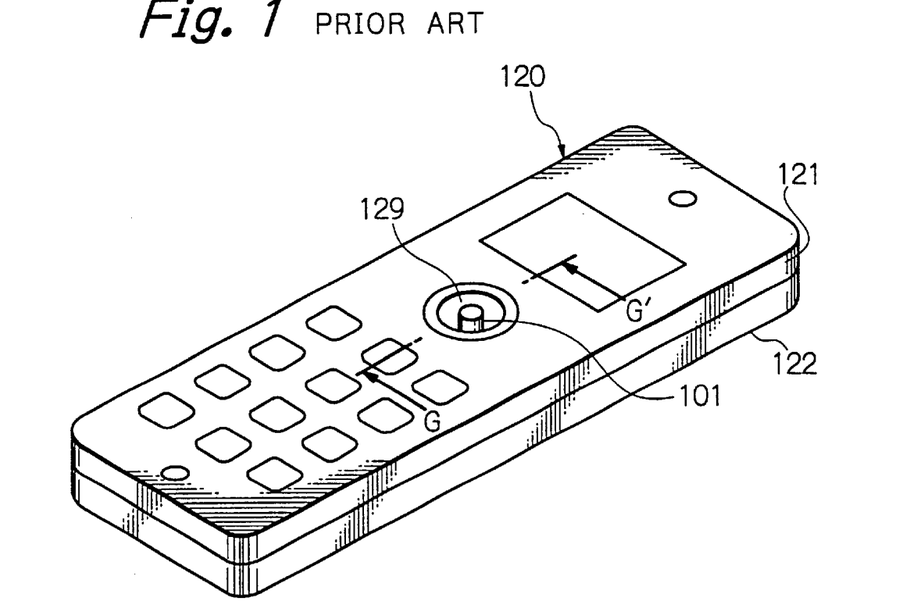
FIG. 1 is an external perspective view of a mobile terminal including a conventional knob for a stick switch.
Figure 2:
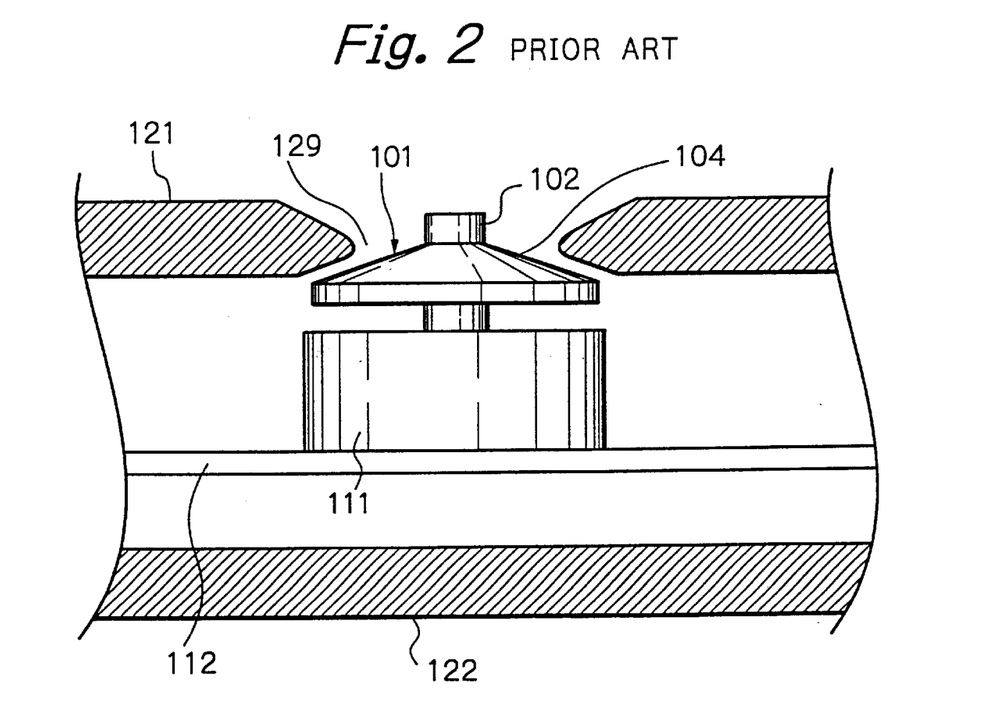
FIG. 2 is a sectional view along line G–G' of FIG. 1.

To better understand the present invention, brief reference will be made to a conventional knob for a stick switch. FIG. 1 shows a mobile terminal including a conventional knob 101 while FIG. 2 shows the knob 101 in detail. As shown in FIG. 1, the mobile terminal includes a casing made up of a cover 121 and a case 122. The cover 121 is formed with a hole 129 in which the knob 101 is positioned. The knob 101 is exposed to the outside via the hole 129, so that the user of the mobile terminal can touch and move the knob 101.

As shown in FIG. 2, a stick switch 111 including the knob 101 is soldered or otherwise affixed to a circuit board 112 disposed in the casing. The knob 101 includes a skirt portion 104 for concealing structural elements arranged in the casing, and a lug 102 positioned on the top of the skirt portion 104. The end of the lug 102 which the user's finger is expected to touch is formed flat. The lug 102 does not protrude from the surface of the casing, so that the operator is prevented from accidentally touching the knob 101 and causing the switch 111 to malfunction.

The above conventional knob 101 has the previously discussed problems left unsolved.

Figure 3A:
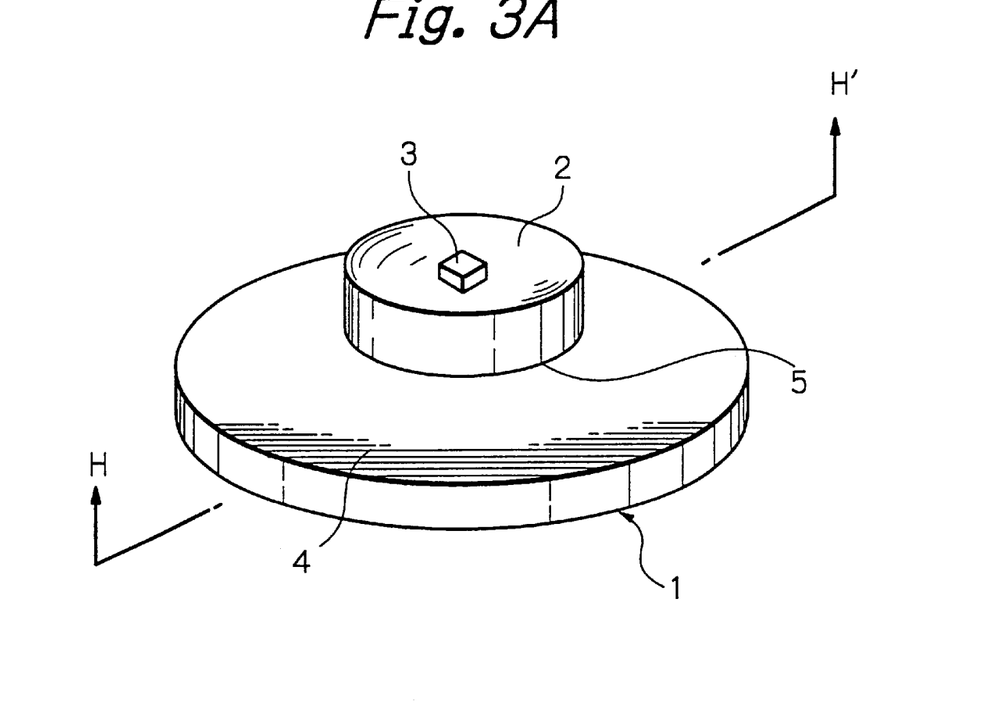
FIG. 3A is an external perspective view showing a knob embodying the present invention.
Figure 3B:
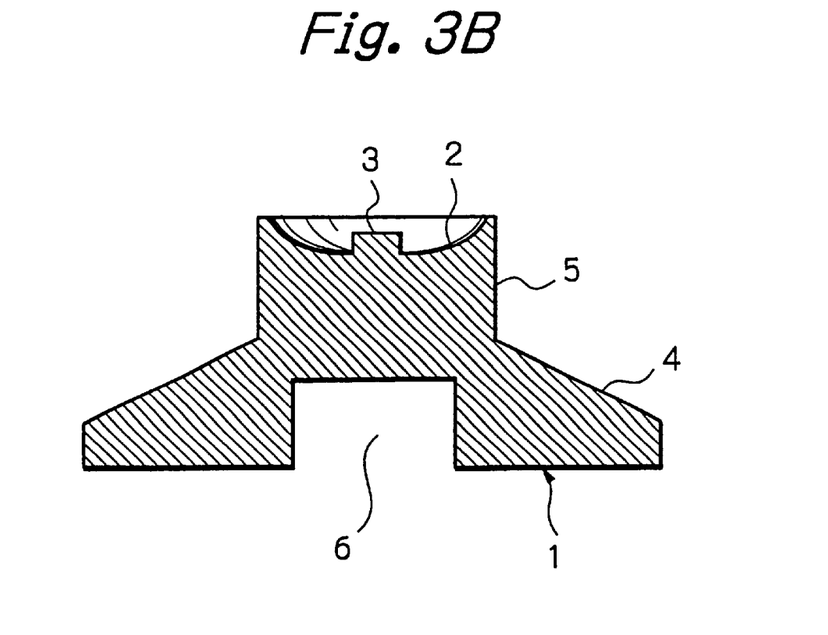
FIG. 3B is a sectional view along line H–H' of FIG. 3A.

Referring to FIGS. 3A and 3B, a knob for a stick switch embodying the present invention will be described. The illustrative embodiment is applied to a mobile terminal by way of example. As shown, the knob, labeled 1, has a lug 5 on its side opposite to the side expected to be mounted to a stick switch not shown. The end of the lug 5 is implemented as a concave surface 2. A projection 3 protrudes from the concave surface 2 and plays the role of a stop. The knob 1 additionally includes a skirt portion 4 and a recess 6.

To tilt the knob 1 in a desired direction, the user of the mobile terminal puts one finger on the concave surface 2 of the lug 5 and pushes the lug 5 in the desired direction. At this instant, the projection 3 bites into the bulb of the user's finger so as to prevent it from slipping on the concave surface 2. The user can therefore tilt the stick switch in the desired direction.

In the illustrative embodiment, the projection 3 should preferably protrude from substantially the center of the concave surface 2. In addition, at least one projection 3 is positioned on one axis or each of a plurality of axes extending in directions in which the stick switch is tiltable. Such projections 3 are offset from the center of the stick switch by a preselected distance on the above axes (see FIGS. 10A and 10B).

More specifically, as shown in FIG. 3A, the skirt portion 4 conceals structural elements arranged in the mobile terminal when mounted to the mobile terminal. The skirt portion 4 is so sized as to prevent the knob I from slipping out of the body of the mobile terminal when separated from the stick switch. As shown in FIG. 3B, the lug 5 protrudes from the top of the skirt portion 4 and formed with the concave surface 2. The projection 3 located at the center of the concave surface 2 is implemented as a cube. The recess 6 is formed in the bottom of the knob 1 in order to receive a stick, not shown, included in the stick switch for thereby positioning the knob 1.

Figure 4:
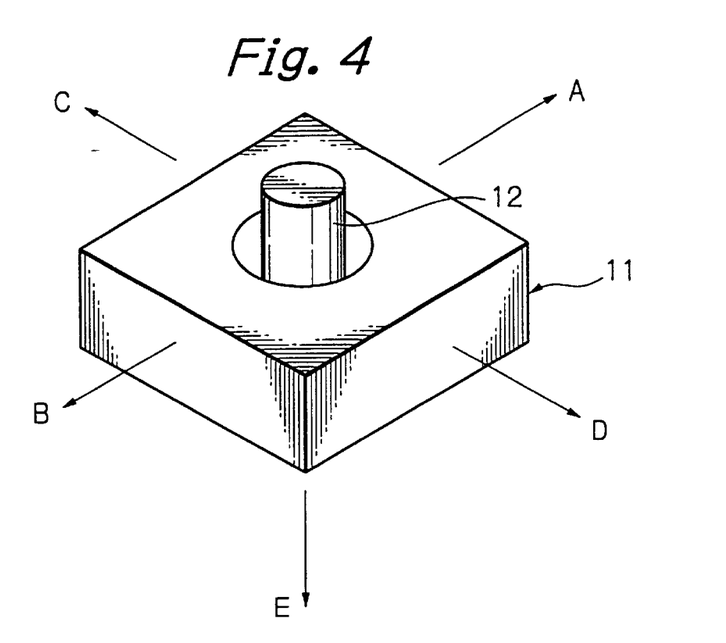
FIG. 4 is an external perspective view showing a specific configuration of a stick switch on which the knob of FIGS. 3A and 3B is mounted.

FIG. 4 shows a specific configuration of the stick switch to which the knob 1 is to be mounted. As shown, the stick switch, generally 11, is an electric part and includes a stick 12. The stick 12 is tiltable in any one of four directions A, B, C and D in a single plane or sinkable in a direction E perpendicular to the above plane. When the stick 12 is tilted in any one of the directions A–D or pushed down in the direction E, it sets up electrical connection for signal transmission.

Figure 5:
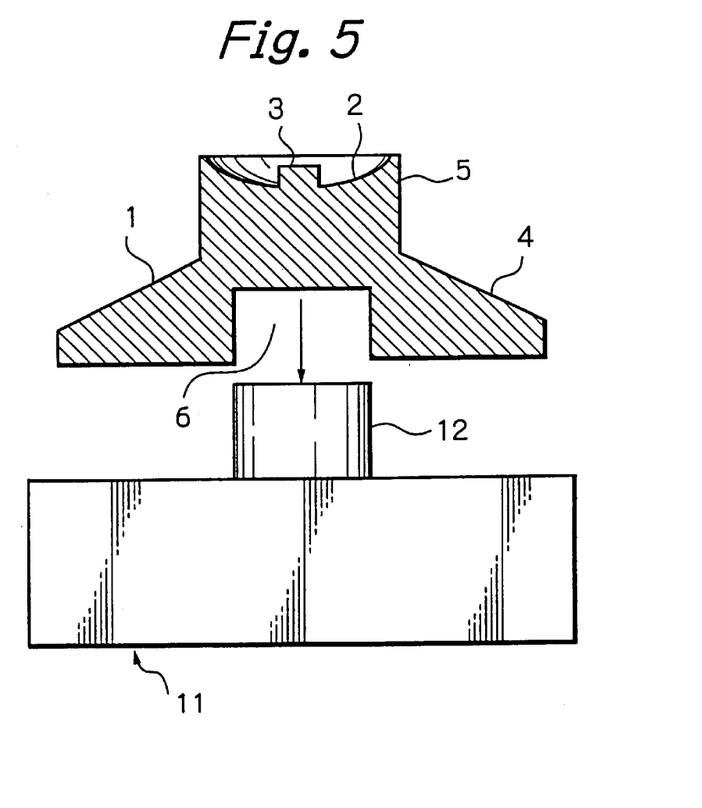
FIG. 5 is a view showing how the knob of FIGS. 3A and 3B is mounted to a stick included in a stick switch.
Figure 6:
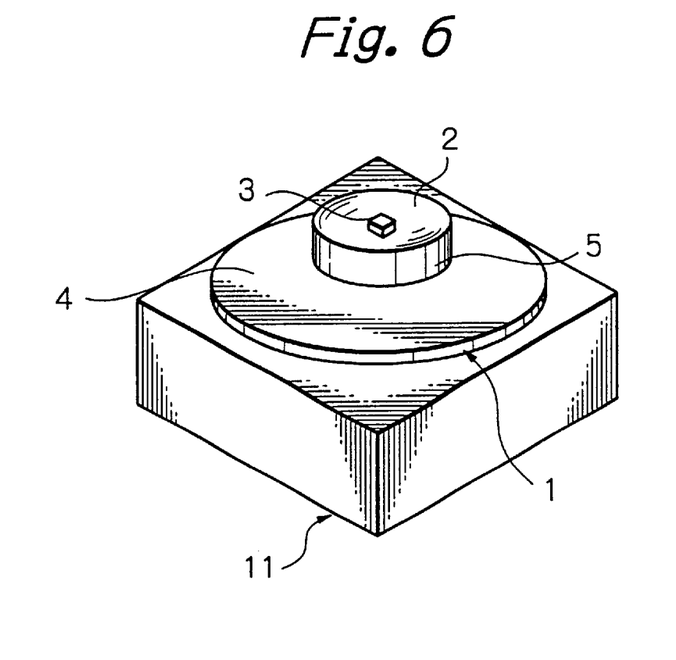
FIG. 6 is an external perspective view showing the assembly of the knob and stick switch of FIG. 5.

FIG. 5 demonstrates how the knob 1 is mounted to the stick 12 of the stick switch 11. As shown, the recess 6 formed in the bottom of the skirt portion 4 of the knob 1 is coupled over the stick 12 of the stick switch 11. The knob 1 may be affixed to the stick 12 by any one of conventional schemes so long as it prevents the knob 1 from easily separating from the stick 12 when the knob 1 is actually operated by the user. FIG. 6 shows the resulting assembly of the knob 1 and stick switch 11.

Figure 7:
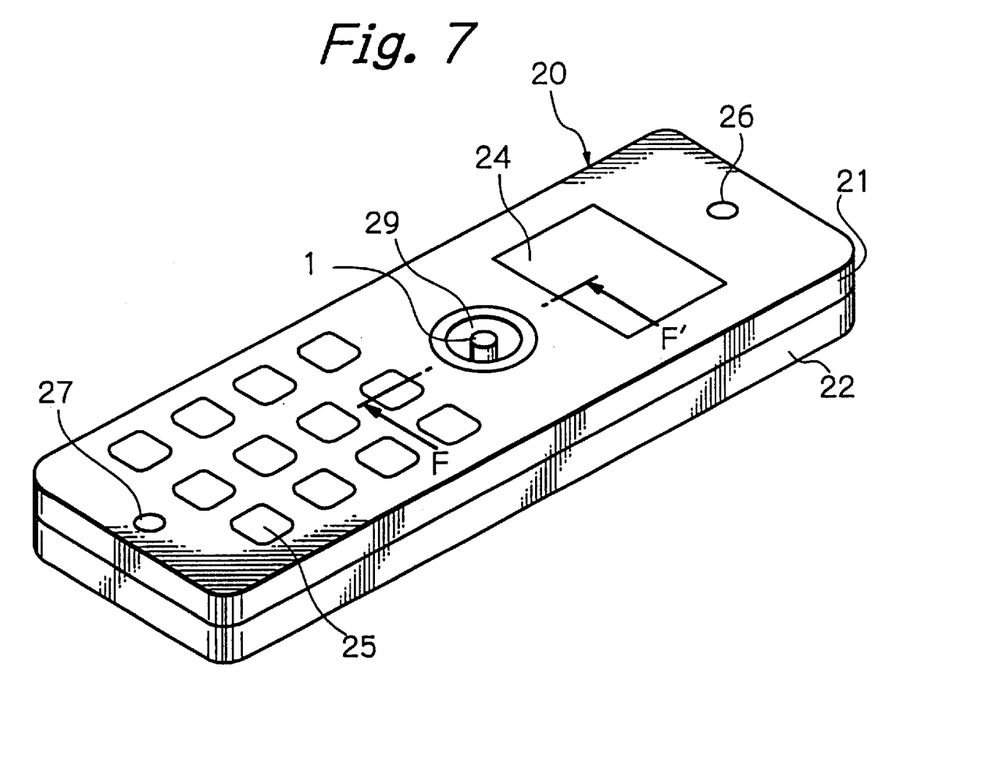
FIG. 7 is an external perspective view showing a mobile terminal including the illustrative embodiment.
Figure 8:
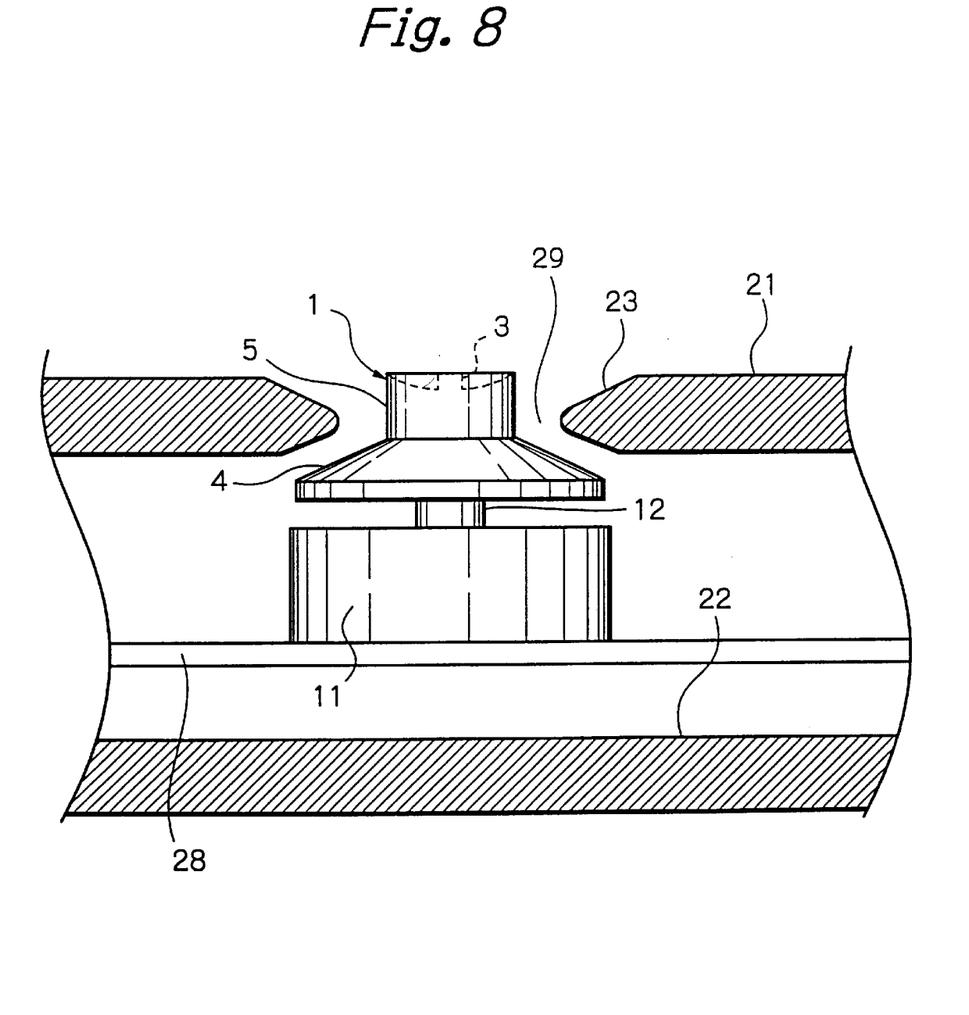
FIG. 8 is a fragmentary sectional view along line F–F' of FIG. 7.

FIG. 7 shows the mobile terminal including the knob 1 while FIG. 8 shows the stick switch 11 and members surround it more specifically. As shown in FIG. 7, the mobile terminal, generally 20, includes a case 22 and a cover 21 constituting a casing in combination. Arranged on the cover 21 are keys 25 for inputting phone numbers and other information and a display 24 for displaying the information input on the keys 25. Also arranged on the cover 21 are a speaker or receiver 26 and a microphone or transmitter 27. The knob 1 is positioned in a hole 29 formed in the cover 21.

As shown in FIG. 8, the hole 29 formed in the cover 21 has its edge 23 tapered inward for facilitating the operation of the knob 1. The stick switch 11 movable in a horizontal plane and in a direction perpendicular thereto is affixed to and electrically connected to a circuit board 28 by solder. The skirt portion 4 of the knob 1 has a greater size than the hole 29 in order to prevent the knob 1 from slipping out of the body of the mobile terminal 20 when separated from the stick 12.

Figure 9:
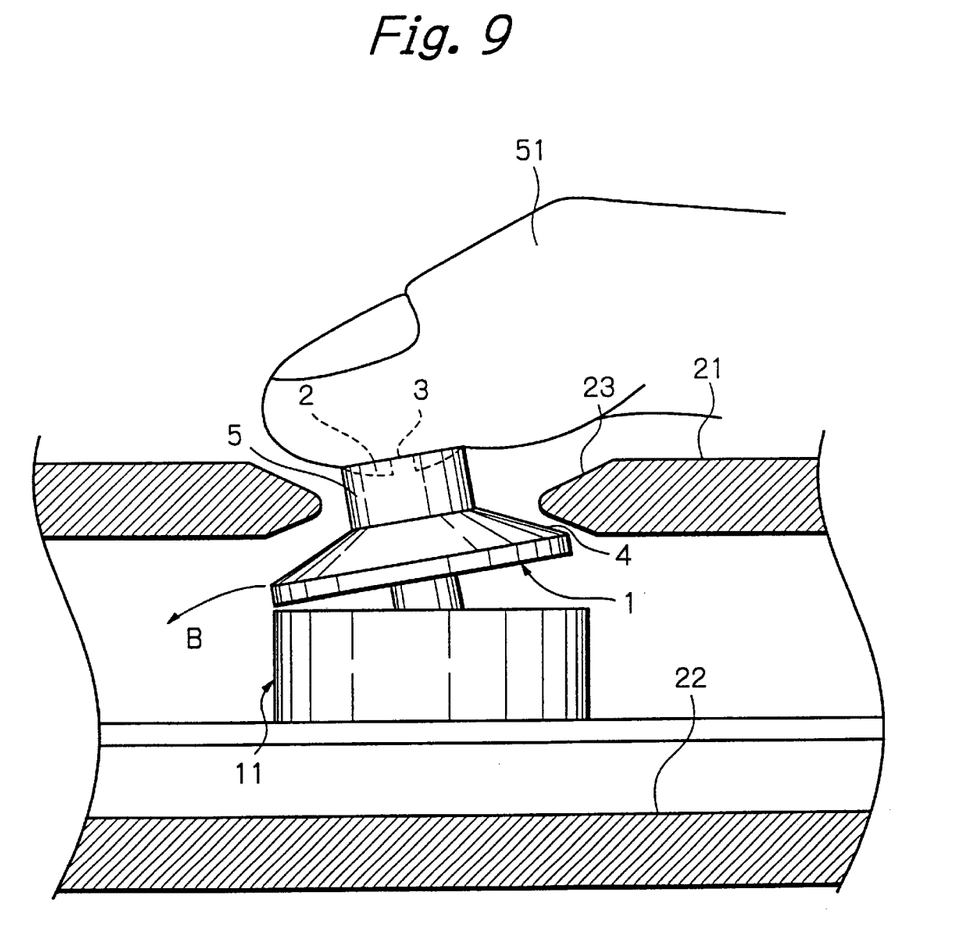
FIG. 9 is a view showing a specific condition wherein the user of the mobile terminal operates the knob of the stick switch.

The movement of the knob 1 will be described with reference to FIG. 9. Assume that the user tilts the stick 12 of the stick switch 11 in the direction B by touching the knob 1, as shown in FIG. 9. More specifically, assume that the user puts one finger 51 on the concave surface 2 of the lug 5 and pushes the lug 5 in the direction B. Then, the projection 3 protruding from the concave surface 2 bites into the bulb of the finger 51, preventing the finger 51 from slipping on the concave surface 2. The user can therefore surely and easily tilt the stick switch 11 in the desired direction B. In addition, the rear edge portion of the lug 5 in the direction B also bites into the bulb of the finger 51 moving in the direction B. This successfully intensifies the force with which the lug 5 grips the finger 51.

Further, even when the user pushes the knob 1 sideways without touching the concave surface 2 of the lug 5, the above edge of the concave surface 2 bites into the bulb of the user's finger and promotes easy and sure operation.

Moreover, the gripping force of the lug 5 acting in the horizontal direction also promotes easy and sure operation in the perpendicular direction. It follows that a single knob 1 allows the stick switch to move horizontally and vertically in a desirable manner.

Figure 10A:
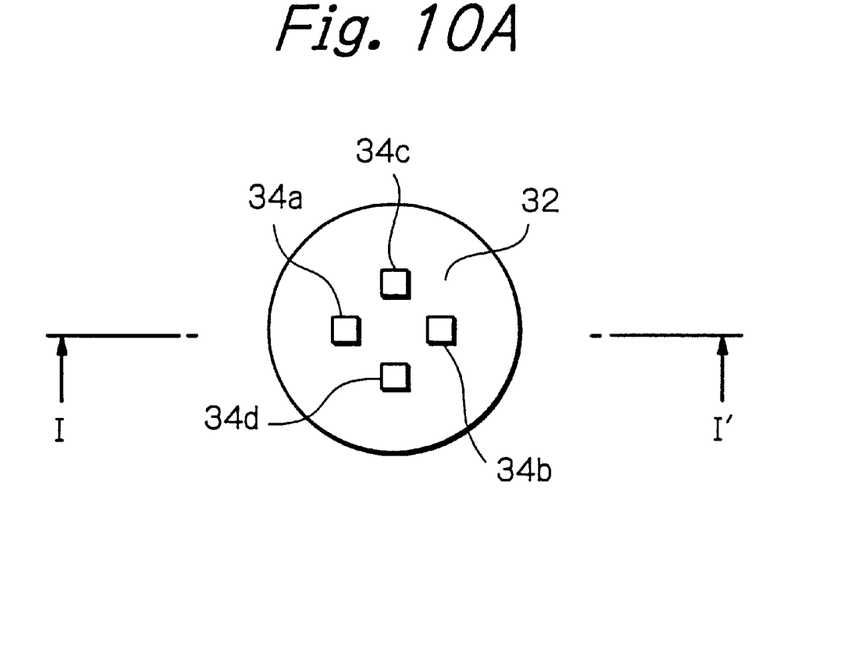
FIG. 10A is a plan view showing an alternative embodiment of the present invention.
Figure 10B:
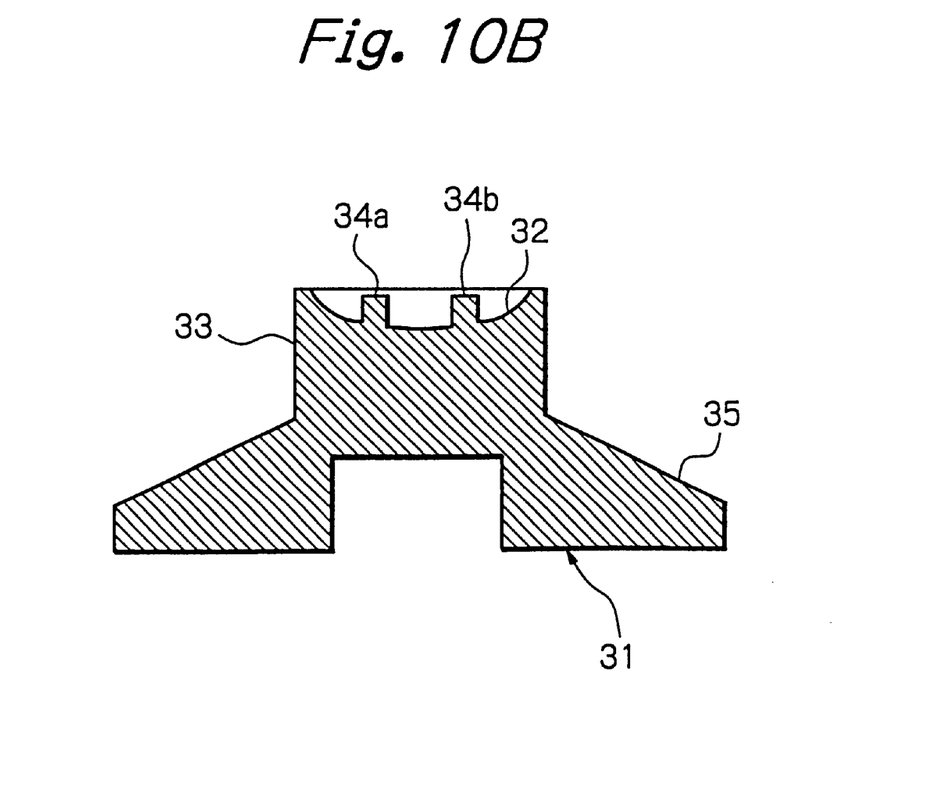
FIG. 10B is a sectional view along line I–I' FIG. 10A.

Reference will be made to FIG. 10A and 10B for describing an alternative embodiment of the present invention. As shown, a knob 31 includes a skirt portion 35 and a lug 33 protruding from the top of the skirt portion 35. The end of the lug 33 remote from the skirt portion 35 is formed with a concave surface 32. Four cubic projections 34a, 34b, 34c and 34d are formed on the concave surface 32. The projections 34a–34d are offset from the center of the concave surface 32 by a preselected distance in the directions A–D in which the switch 11, FIG. 4, is tiltable.

When the user intending to operate the switch 11 puts the finger 51, FIG. 9, on the concave surface 32, the finger 51 closely contacts the concave surface 32. When the user moves the finger 51 for tilting the knob 31 in any one of the directions A–D, one of the projections 34a–34d offset forward from the center of the concave surface 32 in the direction which the finger 51 is moved and bites into the bulb of the finger 51. This not only increases the gripping force, but also allows the user feeling the projection 34 to surely recognize the tilting direction.

While the above embodiments each has a concave surface formed in the end of the knob in order to insure the close contact of the user's finger and the end of the knob, the concave surface is only illustrative. The crux is that the inner portion of the top of the lug be recessed so as to allow the knob to surely bite into and grip the user's finger. However, the concave surface provides the end of the knob with an edge sharp enough to catch the user's finger when the knob is tilted. This, coupled with the fact that the finger closely contacts the concave surface, i.e., the projections facilitates the tilt of the knob.

In summary, it will be seen that the present invention provides a knob for a stick switch having the following unprecedented advantages. A person can operate the knob surely and easily because the end of the knob to touch is concave and formed with at least one projection.

Further, the knob of the present invention is miniature and contributes a great deal to the small size, thin configuration and therefore attractive design of a mobile terminal. Specifically, because the knob whose end to touch is concave and formed with one or more projections is easy to operate, it surely grips a finger without resorting to a great height or a great area.

Various modifications will become possible for those skilled in the art after receiving the teachings of the present disclosure without departing from the scope thereof.

What is claimed is:

1. A knob mounted on one end of a stick of a stick switch and selectively sinkable in an axial direction of said stick and tiltable in any one of preselected directions, said knob comprising:

a concave surface formed on an end opposite to an end to be mounted to said stick, said concave surface having an edge; and a projection protruding from said concave surface, said projection present on an axis extending from a center of said knob, wherein said edge of said concave surface and said projection are felt by an operator while touching and tilting said knob so that a direction of said knob is determined.

2. A knob as claimed in claim 1, wherein said projection protrudes from substantially a center of said concave surface.

3. A knob as claimed in claim 1, wherein said projection comprises at least one projection positioned on at least one axis on which the stick switch is tiltable.

4. A knob as claimed in claim 3, wherein said projection comprises a plurality of projections positioned face-to-face on an axis along which the stick switch is tiltable and are offset from a center of the stick by a preselected distance.

5. A knob mounted on one end of a stick of a stick switch and selectively sinkable in an axial direction of said stick and tiltable in any one of preselected directions, said knob comprising:
- a concave surface on which a person's finger is to be put, said concave surface having an edge; and
- a projection protruding from said concave surface, said projection present on an axis extending from a center of said knob,
- wherein said edge of said concave surface and said projection are felt by the person's finger while touching and tilting said knob so that a direction of said knob is determined.

6. A knob as claimed in claim 5, wherein said projection protrudes from substantially a center of said concave surface.

7. A knob as claimed in claim 5, wherein said projection comprises at least one projection positioned on at least one axis on which the stick switch is tiltable.

8. A knob as claimed in claim 7, wherein said projection comprises a plurality of projections positioned face-to-face on a single axis along which the stick switch is tiltable and are offset from a center of the stick by a preselected distance.

* * * * *